United States Patent
Hancock

(10) Patent No.: US 8,448,945 B2
(45) Date of Patent: May 28, 2013

(54) THREE DIMENSIONAL RANDOM NUMBER GENERATOR

(75) Inventor: Eric A. Hancock, Bellingham, WA (US)

(73) Assignees: Eric A. Hancock, Bellingham, WA (US); Joey Shawn Warner, Bellingham, WA (US)

( * ) Notice: Subject to any disclaimer, the term of this patent is extended or adjusted under 35 U.S.C. 154(b) by 0 days.

(21) Appl. No.: 12/986,078

(22) Filed: Jan. 6, 2011

(65) Prior Publication Data

US 2011/0163497 A1    Jul. 7, 2011

Related U.S. Application Data

(60) Provisional application No. 61/292,709, filed on Jan. 6, 2010.

(51) Int. Cl.
*A63F 9/00* (2006.01)

(52) U.S. Cl.
USPC ............... 273/142 R; 273/142 H; 273/276; 708/255

(58) Field of Classification Search
USPC .......................... 273/142 R, 143
See application file for complete search history.

(56) References Cited

U.S. PATENT DOCUMENTS

| | | | | |
|---|---|---|---|---|
| 3,441,281 A | * | 4/1969 | Pannwitz | 273/142 R |
| 4,732,386 A | * | 3/1988 | Rayfiel | 463/20 |
| 5,274,445 A | * | 12/1993 | Overton et al. | 348/181 |
| 5,382,023 A | * | 1/1995 | Roberts et al. | 273/142 H |
| 5,941,427 A | * | 8/1999 | Speer | 222/189.06 |
| 6,195,669 B1 | * | 2/2001 | Onodera et al. | 708/3 |
| 6,388,663 B2 | * | 5/2002 | Hiroi | 345/419 |
| 6,537,152 B2 | * | 3/2003 | Seelig et al. | 463/30 |
| 7,519,476 B1 | * | 4/2009 | Tnacheri et al. | 702/11 |
| 7,571,200 B2 | * | 8/2009 | Shackleford et al. | 708/250 |
| 7,844,649 B2 | * | 11/2010 | Fiorentino et al. | 708/255 |
| 2003/0076956 A1 | * | 4/2003 | Shackleford et al. | 380/263 |

* cited by examiner

*Primary Examiner* — Alvin A Hunter
*Assistant Examiner* — Dolores Collins
(74) *Attorney, Agent, or Firm* — Sinorica, LLC

(57) ABSTRACT

A method and apparatus for generating three dimensional random numbers using three separate number generators for the x-axis, the y-axis, and the z-axis. The present invention aims to further randomize number generation making use of the human intuitive sense. The number generators for each axis are the same apparatus. The random number generator apparatus makes use of disks that rotate at different rates with digits that are evenly distributed in a radial fashion. A reading sensor scans digits at certain positioned when a user intuitively triggers for a scan.

12 Claims, 7 Drawing Sheets

(01) x.-a.01 specifies reading location – i.e. first number on first plate.
(02) y.-b.01 specifies reading location – i.e. first number on first plate.
(03) z.-a.01 specifies reading location – i.e. first number on first plate.

8 6 4 2 0 1 3 5 7 9 (144rps)   8 6 4 2 0 1 3 5 7 9 (144rps)   8 6 4 2 0 1 3 5 7 9 (144rps)
7 3 0 4 8 6 2 1 5 9 (089rps)   7 3 0 4 8 6 2 1 5 9 (089rps)   7 3 0 4 8 6 2 1 5 9 (089rps)
5 2 8 0 7 3 4 6 1 9 (055rps)   5 2 8 0 7 3 4 6 1 9 (055rps)   5 2 8 0 7 3 4 6 1 9 (055rps)
1 4 7 8 5 2 0 3 6 9 (034rps)   1 4 7 8 5 2 0 3 6 9 (034rps)   1 4 7 8 5 2 0 3 6 9 (034rps)
6 0 5 7 1 4 8 2 3 9 (021rps)   6 0 5 7 1 4 8 2 3 9 (021rps)   6 0 5 7 1 4 8 2 3 9 (021rps)
3 8 1 5 6 0 7 4 2 9 (013rps)   3 8 1 5 6 0 7 4 2 9 (013rps)   3 8 1 5 6 0 7 4 2 9 (013rps)
2 7 6 1 3 8 5 0 4 9 (008rps)   2 7 6 1 3 8 5 0 4 9 (008rps)   2 7 6 1 3 8 5 0 4 9 (008rps)
4 5 3 6 2 7 1 8 0 9 (005rps)   4 5 3 6 2 7 1 8 0 9 (005rps)   4 5 3 6 2 7 1 8 0 9 (005rps)
0 1 2 3 4 5 6 7 8 9 (003rps)   0 1 2 3 4 5 6 7 8 9 (003rps)   0 1 2 3 4 5 6 7 8 9 (003rps)

X-Axis (a. perspective)   Y-Axis (a. perspective)   Z-Axis (a. perspective)

↕ READING SENSOR IN THE CENTER ↕

X-Axis (b. perspective)   Y-Axis (b. perspective)   Z-Axis (b. perspective)

9 8 7 6 5 4 3 2 1 0 (003rps)   9 8 7 6 5 4 3 2 1 0 (003rps)   9 8 7 6 5 4 3 2 1 0 (003rps)
5 4 6 3 7 2 8 1 9 0 (005rps)   5 4 6 3 7 2 8 1 9 0 (005rps)   5 4 6 3 7 2 8 1 9 0 (005rps)
7 2 3 8 6 1 4 9 5 0 (008rps)   7 2 3 8 6 1 4 9 5 0 (008rps)   7 2 3 8 6 1 4 9 5 0 (008rps)
6 1 8 4 3 9 2 5 7 0 (013rps)   6 1 8 4 3 9 2 5 7 0 (013rps)   6 1 8 4 3 9 2 5 7 0 (013rps)
3 9 4 2 8 5 1 7 6 0 (021rps)   3 9 4 2 8 5 1 7 6 0 (021rps)   3 9 4 2 8 5 1 7 6 0 (021rps)
8 5 2 1 4 7 9 6 3 0 (034rps)   8 5 2 1 4 7 9 6 3 0 (034rps)   8 5 2 1 4 7 9 6 3 0 (034rps)
4 7 1 9 2 6 5 3 8 0 (055rps)   4 7 1 9 2 6 5 3 8 0 (055rps)   4 7 1 9 2 6 5 3 8 0 (055rps)
2 6 9 5 1 3 7 8 4 0 (089rps)   2 6 9 5 1 3 7 8 4 0 (089rps)   2 6 9 5 1 3 7 8 4 0 (089rps)
1 3 5 7 9 8 6 4 2 0 (144rps)   1 3 5 7 9 8 6 4 2 0 (144rps)   1 3 5 7 9 8 6 4 2 0 (144rps)

FIG. 7

THREE DIMENSIONAL RANDOM NUMBER GENERATOR

The current application claims a priority to the U.S. Provisional Patent application Ser. No. 61/292,709 filed on Jan. 6, 2010.

FIELD OF THE INVENTION

The present invention relates generally to physical random number generator that makes use of a series of rotating plates to generate random numbers. More specifically, rather than the use of linear random number generation, the present invention makes use of a physical intuitive number generator.

BACKGROUND OF THE INVENTION

Presently, the random number generators are typically computer generated numbers. However, there are no three-dimensional random number generators nor are there any random number generators that make use of motion and timing and preformatted sequences of increasingly random numbers when generating random numbers. Existing random number generators use mathematical equations and formulas to simulate randomness. It is the objective of the present invention to provide true randomness in number generation. True randomness requires the integration of timing or more precisely an individual intuitive sense of timing as a deciding factor when "randomly" selecting numbers. The underlying philosophy is intuitive sense of timing is unique to humans and unlike machines. In an everyday experience humans can call upon the subtle resource of intuition and intuitive sense of timing when making decisions and choices.

The practical idea of a three-dimensional random number generator is to enable and allow an individual to make numerical choices based on intuitive sense of timing and for the following described invention to serve as an "intuitive bridge" between the digital world, a world that traditionally does not respond to intuitive timing, and a world known on some level to be organized and orchestrated by intuition. The world is in three dimensions and the virtual world is also moving towards three-dimensional modeling and representations.

The belief is a "digital bridge" implemented in traditional digital technology and placed between the individual and the digital world (such as an individual and the internet or an individual and e-mail) would serve to enhance individual informational relevancy. For example an "intuitive bridge" would sort what e-mails are read and in what order to help orchestrate optimal meaning. The design of the random number generator presented by the present invention can be encoded in a computer software program (in the future) yet a concrete and original form of the idea is presented here as a mechanical 3-dimensional random number generator. The present invention is a physical random number generator that makes use of a series of plates with preformatted numbers that rotate at different rates to generate random numbers.

BRIEF DESCRIPTION OF THE DRAWINGS

FIG. 6 is the reading position schedule for scanning one of ten locations on 54 plates. Reading pattern is 3-dimensional alternating through an x, y, z, 3-dimensional axis.

FIG. 7 is a text example of the numbers being scanned on each disk of the first perspective disk set and the second perspective disk set. The bolded number represent the numbers that have been scanned as the random number.

DETAIL DESCRIPTIONS OF THE INVENTION

All illustrations of the drawings are for the purpose of describing selected versions of the present invention and are not intended to limit the scope of the present invention.

The present invention is an apparatus and a method of using the apparatus to generate a series of random numbers in a 3-dimensional reading pattern. To create three dimensional random numbers, the present invention comprises a plurality of axis number generators 1 used as three separate axis number generators to represent an X-axis number, a Y-axis number, and a Z-axis number. Each of the plurality of number generators move in unison.

Figure 1:
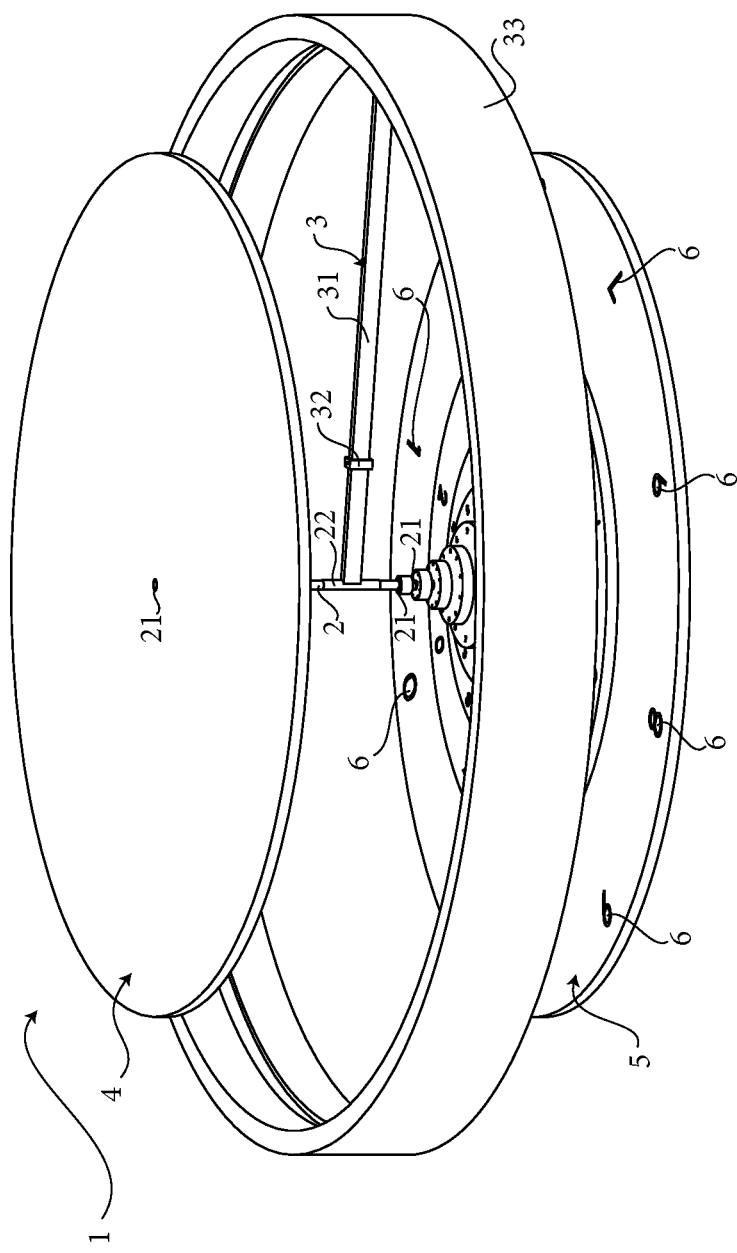
FIG. 1 is a perspective view of the apparatus of the present invention.
Figure 2:
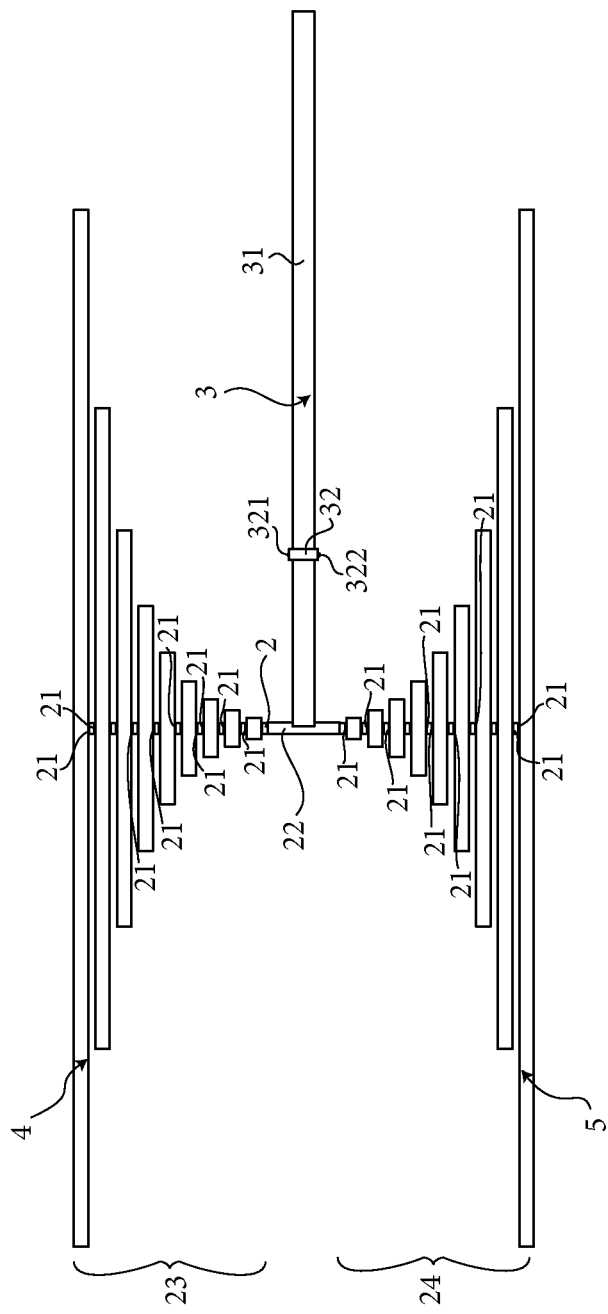
FIG. 2 is a front side elevational view of the apparatus for the present invention without the circumferential track.

In reference to FIG. 1 and FIG. 2, each of the axis number generators comprises of an axis gear train axle 2, a number reader 3, a first perspective disk set 4, a second perspective disk set 5, and a plurality of single digit numbers 6. The axis gear train axle 2 further comprises a plurality of disk bearings 21, a first perspective section 23, a second perspective section 24, and a number reader arm mount 22. The axis gear train axle 2 is the main frame of the present invention that holds all of the other components. The number reader 3 further comprises an extension arm 31 and a reading sensor 32. The number reader 3 is a reading device that is controlled by the user to catch or generate the random numbers from the apparatus. The first perspective disk set 4 and the second perspective disk set 5 are the mediums for the random numbers. The first perspective disk set 4 is a set of nine first perspective disks. The second perspective disk set 5 is a set of nine second perspective disks. The first perspective disk set 4 and the second perspective disk set 5 are circularly shaped disks.

In reference to FIG. 2, the axis gear train axle 2 is sectioned into having a center, a first end, and a second end. The number reader arm mount 22 of the axis gear train axle 2 is fixedly positioned on the center of the axis gear train axle 2. The number reader 3 having a reading sensor 32 is mounted to an extension arm 31 and travels from center to circumference reading either the first perspective disk set 4 of the second perspective disk set 5. Although fixedly positioned, the number reader arm mount 22 is moveable about the axis gear train axle 2. The first perspective section 23 of the axis gear train axle 2 is defined between the center and the first end. The second perspective section 24 of the axis gear train axle 2 is defined between the center and the second end. The plurality of disk bearings 21 is distributed evenly along the first perspective section 23 and the second perspective section 24. In the preferred embodiment of the present invention, because of the number of perspective disks provided for each the first perspective disk set 4 and the second perspective disk set 5, there are nine corresponding disk bearings distributed along the first perspective section 23 and another nine corresponding disk bearings distributed along the second perspective section 24. Similar to the number reader arm mount 22, the plurality of disk bearings 21 are pivotable about the axis gear train axle 2. Each of the disks of the set of nine first perspective disks is sized differently. Each of the disks of the set of nine second perspective disks is sized to match the set of nine first perspective disks. The first perspective disk set 4 is connected to the first perspective section 23 of the axis gear train axle 2 by means of the plurality of disk bearings 21. In a similar fashion, the second perspective disk set 5 is connected to the second perspective section 24 of the axis gear train axle 2 by means of the plurality of disk bearings 21. The difference between the first perspective disk set 4 and the second perspective disk set 5 lies in their arrangements of disks. For the first perspective disk set 4, the disks are arranged on the first perspective section 23 by order of size with the largest disk positioned towards the first end. For the second perspective disk set 5, the disks are arranged on the second perspective section 24 by order of size with the largest disk positioned towards the second end.

Figure 3:
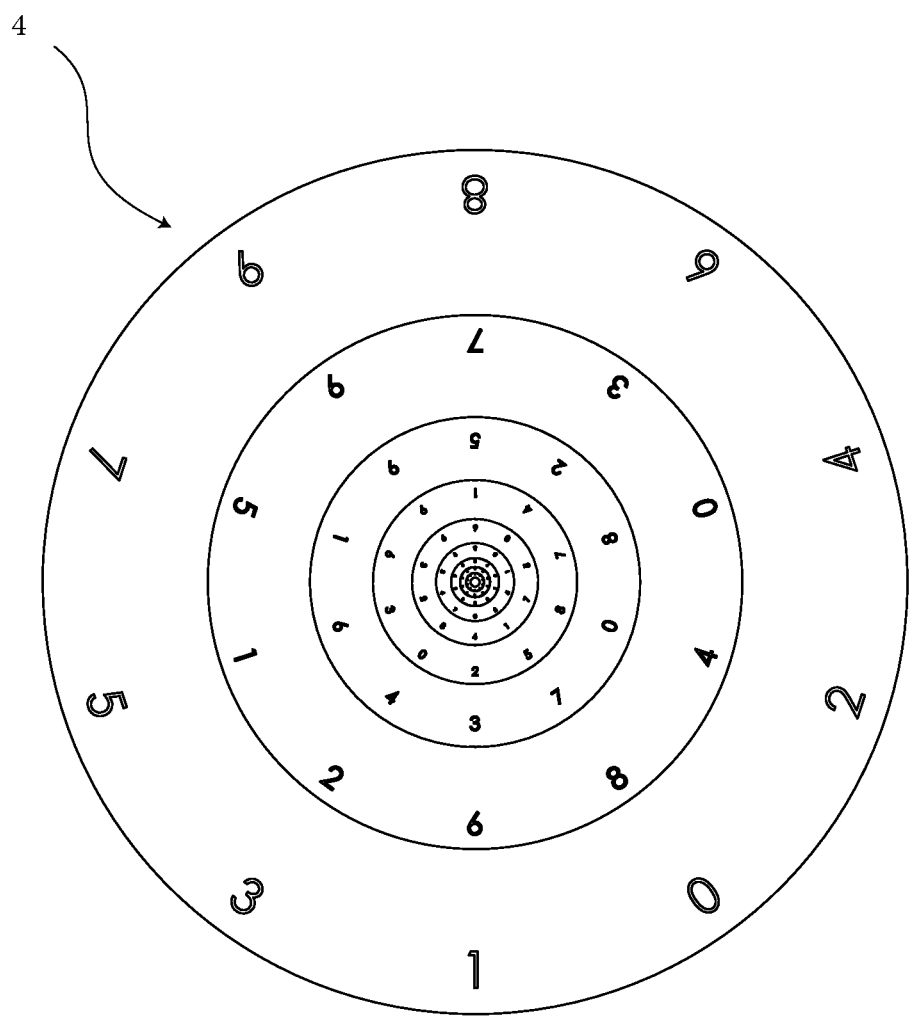
FIG. 3 is a bottom view of the first perspective disk set showing the distribution of the plurality of single digit numbers.
Figure 4:
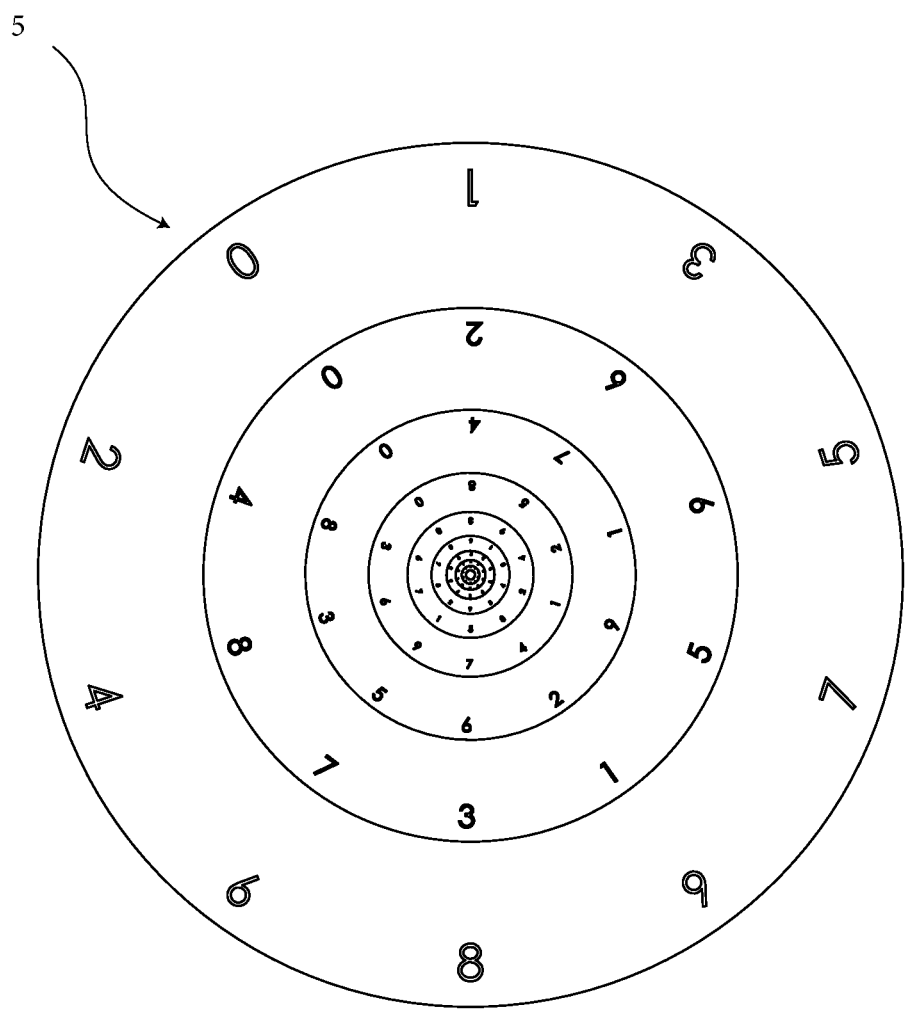
FIG. 4 is a top view of the second perspective disk set showing the distribution of the plurality of single digit numbers.

In reference to FIG. 3 and FIG. 4, the plurality of single digit numbers 6 are equally distributed and radially positioned on each disk of the first perspective disk set 4 and the second perspective disk set 5. In the preferred embodiment of the present invention, each disk comprises ten single digit numbers ranging from zero to nine. This means that each disk of the first perspective disk set 4 and the second perspective disk set 5 have no repeated numbers. However, the order in which the numbers are arranged vary from one disk to another. In the preferred embodiment of the present invention, the plurality of single digits positioned on each disk of the first perspective disk set 4 are in the follow manner:

The first perspective disk set:

| Disk 1 (largest): | 8 6 4 2 0 1 3 5 7 9 |
|---|---|
| Disk 2: | 7 3 0 4 8 6 2 1 5 9 |
| Disk 3: | 5 2 8 0 7 3 4 6 1 9 |
| Disk 4: | 1 4 7 8 5 2 0 3 6 9 |
| Disk 5: | 6 0 5 7 1 4 8 2 3 9 |
| Disk 6: | 3 8 1 5 6 0 7 4 2 9 |
| Disk 7: | 2 7 6 1 3 8 5 0 4 9 |
| Disk 8: | 4 5 3 6 2 7 1 8 0 9 |
| Disk 9 (Smallest): | 0 1 2 3 4 5 6 7 8 9 |

To add symmetry to the number selection for the corresponding axis (X, Y, Z), the numbers on the second perspective disk set 5 are a list of reversed numbers:

The second perspective disk set:

| Disk 9 (Smallest): | 9 8 7 6 5 4 3 2 1 0 |
|---|---|
| Disk 8: | 5 4 6 3 7 2 8 1 9 0 |
| Disk 7: | 7 2 3 8 6 1 4 9 5 0 |
| Disk 6: | 6 1 8 4 3 9 2 5 7 0 |
| Disk 5: | 3 9 4 2 8 5 1 7 6 0 |
| Disk 4: | 8 5 2 1 4 7 9 6 3 0 |
| Disk 3: | 4 7 1 9 2 6 5 3 8 0 |
| Disk 2: | 2 6 9 5 1 3 7 8 4 0 |
| Disk 1 (Largest): | 1 3 5 7 9 8 6 4 2 0 |

In reference to FIG. 1, the number reader 3 is connected to the number reader arm mount 22 by means of the extension arm 31. As a result of the extension arm 31 being connected to the number reader arm mount 22, the entire number reader 3 is pivotable about the axis gear train axle 2 to move the reading sensor 32 to preset number positions. The number reader 3 is able to move around the axis gear train axle 2 in a fashion similar to a minute hand pivoting about a clock to allow the reading sensor 32 to move to preset number positions. The preset number positions are positions on a disk where the plurality of single digit numbers 6 is arranged. The movement of the number reader 3 to the preset number positions is controlled by a circumferential track 33. The circumferential track 33 is positioned around the axis number generator and is connected to the end of the extension arm 31 that is opposite of the number reader arm mount 22. The extension arm 31 is an elongated arm that reaches in between the first perspective disk set 4 and the second perspective disk set 5 providing the reading sensor 32 a track to slide on. The extension arm 31 allows the reading sensor 32 to slide in towards the axis gear train axle 2 to read the numbers on the smallest disks or slide out away from the axis gear train axle 2 to read the numbers of the largest disks of either the first perspective disk set 4 or the second perspective disk set 5. With first perspective disk set 4 and the second perspective disk set 5 being positioned on two opposite sides of the reading sensor 32, the reading sensor 32 comprises of a top side, a bottom side, a first perspective sensor 321, and a second perspective sensor 322. The top side is the side of the reading sensor 32 facing the first perspective disk set 4. The bottom side is the side of the reading sensor 32 facing the second perspective disk set 5. The first perspective sensor 321 is positioned in an upward orientation on the top side of the reading sensor 32. The second perspective sensor 322 is positioned in a downward orientation on the bottom side of the reading sensor 32. The first perspective sensor 321 and the second perspective sensor 322 are both sensors that are compatible with recognition software such as a laser reading device or an electronic eye. The first perspective sensor 321 and the second perspective sensor 322 are able to read the numbers on the individual disks of the first perspective disk set 4 and the second perspective disk set 5.

With three separate axis number generators, the present invention is able to generate three dimensional random numbers. To do so, each disk of a perspective view rotate at different rates to increase the randomness of the numbers selected from the process. In the preferred embodiment of the present invention, from the largest disk to the smallest disk, the rate of rotation for each disk for both the first perspective disk set 4 and the second perspective disk set 5 is 144 rotations per second (rps), 89 rps, 55 rps, 34 rps, 21 rps, 13 rps, 8 rps, 5 rps, and 3 rps. This means the first perspective disk set 4 and the second disk set is pivoting about the axis gear train axle 2 with each disk at different rotational rates. The different disk for the first perspective disk set 4 and the second perspective disk set 5 are able to rotate at different rates due to a gear train in the axis gear train axle 2. To obtain three dimensional random numbers, the user triggers the reading sensor 32 to read a number from a specific rotating disk from either the first perspective disk set 4 or the second perspective disk set 5. The user is able to use intuitive sense to randomly trigger the reading sensor 32 to read the number at a specific number position on a selected disk of the selected axis. The specific number position on the selected disk of the selected axis that is being scanned for a random number is determined by a preset reading position schedule to create a three dimensional array of random numbers. To move the reading sensor 32 to the specific position, the extension arm 31 is able to pivot about the axis gear train arm. To select a certain disc to be scanned for a random number, the reading sensor 32 is able to slide along the extension arm 31. The preset reading schedule determines which disk of either the first perspective disk set 4 or the second perspective disk set 5 of X-axis number generator, the Y-axis number generator, or the Z-axis number generator. The present reading position is a predetermined position on each disk of the first perspective sensor 321 or the second perspective sensor 322.

In the preferred embodiment of the present invention, the diameter for the first perspective disk set 4 and the second perspective disk set 5 for X-axis number generator, the Y-axis number generator and the Z-axis number generator are as follows: 72", 44.5", 27.5", 17", 10.5", 6.5", 4", 2.5", and 1.5". With each of the axis number generators having the first perspective disk set 4 and the second perspective disk set 5, there are 6 sets of each disk size. The total number of disks used for the present invention to generate three dimensional random numbers is 54 disks.

Figure 5:
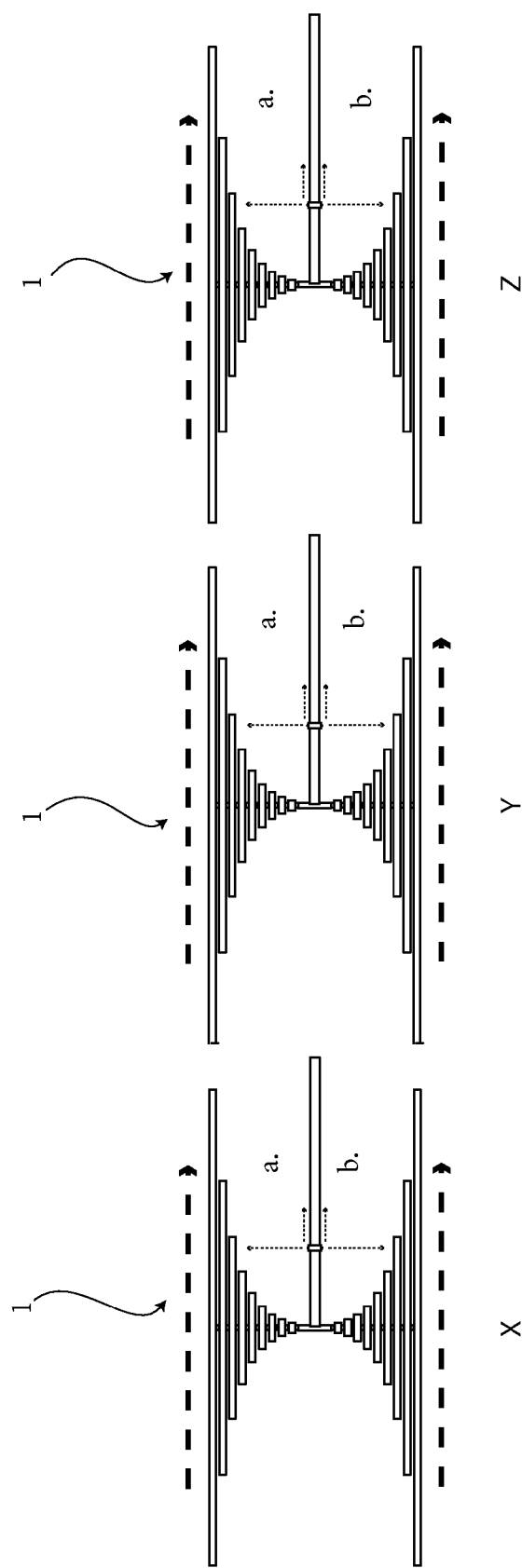
FIG. 5 is a diagram depicting the positioning of 3 number reading devices with the label a. and b. representing the first perspective and the second perspective. The reading sensor travels from center to circumference of the disks in unison for each of the reading devices while randomly reading numbers.
Figure 6:
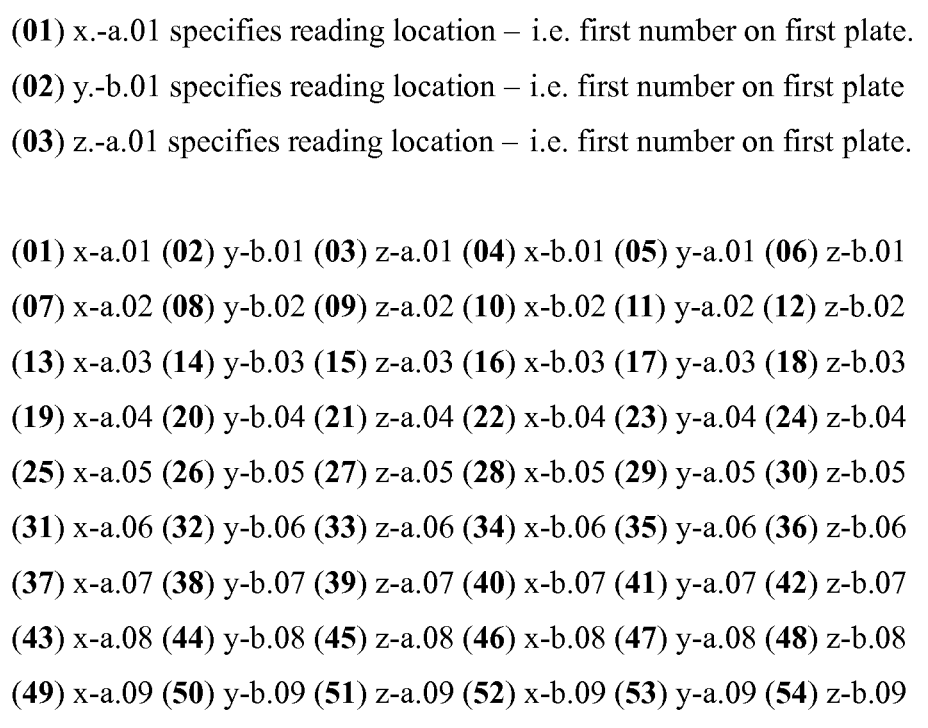

The present invention is able to generate three dimensional random numbers using the preset reading position schedule. FIG. 5 and FIG. 6 shows an example of a preset reading position schedule and a diagram showing where the number is to be read. The symbols on the preset reading position schedule represent the axis, the perspective disk set, and the present number position that is to be scanned for a random number. In the preferred embodiment of the present invention, the letter 'a' represents the first perspective disk set 4 and the letter 'b' represents the second perspective disk set 5. With ten digits total on each disk, the preset reading position represents the column where the random number is to be scanned.

Although the invention has been explained in relation to its preferred embodiment, it is to be understood that many other possible modifications and variations can be made without departing from the spirit and scope of the invention as hereinafter claimed.

What is claimed is:

1. A apparatus of a three dimensional random number generator comprises,
   a plurality of axis number generators;
   each axis number generator of the plurality of axis number generators comprises a axis gear train axle, a number reader, a first perspective disc set, a second perspective disc set, a circumferential track, and a plurality of single digit numbers;
   the axis gear train axle comprises a plurality of disk bearings, a first perspective section, a second perspective section, and a number reader arm mount;
   the number reader comprises an extension arm and a reading sensor;
   the circumferential track being circumferentially positioned about the axis number generator;
   the first perspective disk set being a set of nine first perspective disks;
   the second perspective disk set being a set of nine second perspective disks; and
   the first perspective disk set and the second perspective disk set being circularly shaped.

2. The apparatus of the three dimensional random number generator as claimed in claim 1 comprises,
   the axis gear train axle having a center, a first end, and a second end;
   the number reader arm mount being positioned on the center of the axis gear train axle;
   the number reader arm mount being pivotable about the axis gear train axle;
   the first perspective section being defined between the center and the first end;
   the second perspective section being defined between the center and the second end;
   the plurality of disk bearings being distributed evenly along the first perspective section and the second perspective section; and
   the plurality of disk bearings being pivotable about the axis gear train axle.

3. The apparatus of the three dimensional random number generator as claimed in claim 2 comprises,
   the number reader being connected to the number reader arm mount by means of the extension arm;
   the extension arm being connected to the circumferential track;
   the reading sensor having a top side and a bottom side comprises a first perspective sensor and a second perspective sensor;
   the reading sensor being adjustably mounted to the extension arm;
   the first perspective sensor being positioned on the top side of the reading sensor;
   the first perspective sensor being upwardly oriented;
   the second perspective sensor being positioned on the bottom side of the reading sensor; and
   the second perspective sensor being downwardly oriented.

4. The apparatus of the three dimensional random number generator as claimed in claim 2 comprises,
   wherein each of the disks of the set of nine first perspective disks is each sized differently;
   wherein each of the disks of the set of nine second perspective disks is each sized to match the set of nine first perspective disks;
   the first perspective disk set being connected to the first perspective section of the axis gear train axle by means of the plurality of disk bearings;
   the second perspective disk set being connected to the second perspective section of the axis gear train axle by means of the plurality of disk bearings;
   the first perspective disk set being arranged on the first perspective section by size with the largest disk positioned towards the first end; and
   the second perspective disk set being arranged on the second perspective section by size with the largest disk positioned towards the second end.

5. The apparatus of the three dimensional random number generator as claimed in claim 2 comprises,
   the plurality of single digit numbers being equally distributed and radially positioned on the first perspective disk set and the second perspective disk set;
   the plurality of single digit numbers being numbers ranging from 0-9; and
   the plurality of single digit numbers being unrepeated on each disk of the first perspective disk set and the second perspective disk set.

6. An apparatus of the three dimensional random number generator comprises,
   a plurality of axis number generators;
   each axis number generator of the plurality of axis number generators comprises a axis gear train axle, a number reader, a first perspective disc set, a second perspective disc set, a circumferential track, and a plurality of single digit numbers;
   the axis gear train axle comprises a plurality of disk bearings, a first perspective section, a second perspective section, and a number reader arm mount;
   the number reader comprises an extension arm and a reading sensor;
   the circumferential track being circumferentially positioned about the axis number generator;
   the first perspective disk set being a set of nine first perspective disks;
   the second perspective disk set being a set of nine second perspective disks;

the first perspective disk set and the second perspective disk set being circularly shaped;

the axis gear train axle having a center, a first end, and a second end;

the number reader arm mount being positioned on the center of the axis gear train axle;

the number reader arm mount being pivotable about the axis gear train axle;

the first perspective section being defined between the center and the first end;

the second perspective section being defined between the center and the second end;

the plurality of disk bearings being distributed on the axis gear train axle between the first end and the center;

the plurality of disk bearings being distributed on the axis gear train axle between the second end and the center;

the plurality of disk bearings being pivotable about the axis gear train axle;

the number reader being connected to the number reader arm mount by means of the extension arm;

the reading sensor having a top side and a bottom side comprises a first perspective sensor and a second perspective sensor; and the reading sensor being connected to the extension arm.

7. The apparatus of the three dimensional random number generator as claimed in claim 6 comprises, the first perspective sensor being positioned on the top side of the reading sensor;

the first perspective sensor being upwardly oriented;

the second perspective sensor being positioned on the bottom side of the reading sensor; and the second perspective sensor being downwardly oriented.

8. The apparatus of the three dimensional random number generator as claimed in claim 6 comprises, wherein each of the disks of the set of nine first perspective disks is each sized differently;

wherein each of the disks of the set of nine second perspective disks is each sized to match the set of nine first perspective disks;

the first perspective disk set being connected to the first perspective section of the axis gear train axle by means of the plurality of disk bearings;

the second perspective disk set being connected to the second perspective section of the axis gear train axle by means of the plurality of disk bearings;

the first perspective disk set being arranged on the first perspective section by size with the largest disk positioned towards the first end; and the second perspective disk set being arranged on the second perspective section by size with the largest disk positioned towards the second end.

9. The apparatus of the three dimensional random number generator as claimed in claim 6 comprises, the plurality of single digit numbers being equally distributed and radially positioned on the first perspective disk set and the second perspective disk set;

the plurality of single digit numbers being numbers ranging from 0-9; and the plurality of single digit numbers being unrepeated on each disk of the first perspective disk set and the second perspective disk set.

10. A method of generating three dimensional random number using the apparatus comprises, providing a plurality of axis number generator;

wherein the plurality of axis number generators includes an X-axis number generator, a Y-axis number generator, and a Z-axis number generator;

wherein each of the axis number generators having a axis gear train axle, a number reader, a first perspective disk set, a second perspective disk set, a circumferential track, and a plurality of single digit numbers is able to generate random numbers;

the axis gear train axle having a plurality of disk bearings and number reader arm mount is able to spin the first perspective disk set and the second perspective disk set;

the number reader having an extension arm and a reading sensor; and the circumferential track being circumferentially positioned about the axis number generator;

the plurality of single digit numbers being distributed radially about each disk of the first perspective disk set and the second perspective disk set; said method of generating comprising the steps of:

pivoting of the reading sensor about the axis gear train axle by means of the extension arm and the number reader arm to a preset reading position;

controlling of the pivoting motion of the extension arm by means of the circumferential track;

pivoting of the first perspective disk set about the axis gear train axle;

pivoting of the second perspective disk set about the axis gear train axle;

sliding of the reading sensor along the extension arm; and reading of a random number by the reading sensor a specific position and a specific disk from the first perspective disk set or the second perspective disk set by a preset reading position schedule.

11. A method of using generating three dimensional random number using the apparatus as claimed in claim 10 comprises, wherein the pivoting of the first perspective disk set provides each disk of the first perspective disk set different rates of rotation; and wherein the pivoting of the second perspective disk set provides each disk of the second perspective disk set different rates of rotation.

12. A method of using generating three dimensional random number using the apparatus as claimed in claim 11 comprises, wherein the preset reading position schedule determines which disk of either the first perspective disk set or the second perspective disk set from the X-axis number generator, Y-axis number generator, or the Z-axis number generator; and wherein the present reading position is a predetermined position on each disk of the first perspective sensor and the second perspective sensor.

* * * * *